United States Patent [19]
Matambo et al.

[11] Patent Number: 5,581,883
[45] Date of Patent: Dec. 10, 1996

[54] METHOD OF ASSEMBLING AN EXPANSION DEVICE FOR A REFRIGERATION SYSTEM

[75] Inventors: Thompson J. Matambo; Dallas C. Fox, both of Antioch, Tenn.

[73] Assignee: Whirlpool Corporation, Benton Harbor, Mich.

[21] Appl. No.: 395,138

[22] Filed: Feb. 27, 1995

[51] Int. Cl.$^6$ .................................................... B23P 15/26
[52] U.S. Cl. ........................ 29/890.035; 29/890.054
[58] Field of Search .................. 29/890.14, 890.142, 29/890.03, 890.07, 890.054; 62/511; 228/183; 138/44

[56] References Cited

U.S. PATENT DOCUMENTS

| | | | |
|---|---|---|---|
| 2,291,363 | 7/1942 | Atchison | 29/890.035 |
| 2,694,296 | 11/1954 | Prosck | 138/44 |
| 2,744,429 | 5/1956 | Seely | 29/890.035 |
| 2,821,323 | 1/1958 | Lee | 220/24.5 |
| 2,939,487 | 6/1960 | Fraser et al. | 138/45 |
| 3,109,459 | 11/1963 | Lee et al. | 138/40 |
| 3,496,629 | 2/1970 | Martucci et al. | 228/183 |
| 3,642,030 | 2/1972 | Amick | 138/44 |
| 3,808,830 | 5/1974 | Atkinson et al. | 62/511 |
| 3,877,248 | 4/1975 | Honnold, Jr. | 62/511 |
| 4,506,423 | 3/1985 | Nakamura et al. | 29/157 R |
| 4,522,533 | 6/1985 | Campbell et al. | 138/44 |
| 4,896,696 | 1/1990 | Bradley et al. | 137/513.3 |
| 4,915,135 | 4/1990 | Kellenbarger et al. | 138/44 |
| 5,085,058 | 2/1992 | Aaron et al. | 62/324.6 |
| 5,134,860 | 8/1992 | Drucker | 62/528 |
| 5,186,021 | 2/1993 | Keller | 62/511 |
| 5,214,939 | 6/1993 | Drucker et al. | 62/527 |

*Primary Examiner*—Irene Cuda
*Attorney, Agent, or Firm*—Thomas J. Roth; Mark A. Davis

[57] ABSTRACT

A refrigerant expansion device for expanding refrigerant flowing within a refrigerant line from a condenser to an evaporator in a refrigeration system. The refrigerant expansion device includes a tubular restrictor having a cylindrical main portion and a tapered nozzle portion wherein the nozzle portion includes an outlet end having an orifice. A solder ring is disposed about the tapered nozzle portion and may be press fit onto the restrictor for secure engagement therewith. During the expansion device fabrication, the tubular restrictor is inserted into the refrigerant line to a predetermined position. The exterior of the refrigerant line is then heated at the predetermined position such that heat is transferred through the refrigerant line and melts the solder ring thereby brazing the restrictor to the refrigerant line at the predetermined position.

9 Claims, 1 Drawing Sheet

5,581,883

METHOD OF ASSEMBLING AN EXPANSION DEVICE FOR A REFRIGERATION SYSTEM

BACKGROUND OF THE INVENTION

The present invention relates to an expansion device for reducing the pressure of refrigerant flowing from the condenser to the evaporator in a sealed refrigeration system. Specifically, the present invention relates to an expansion device, commonly referred to as a flow restrictor, formed from a tubular restrictor having a nozzle portion wherein the restrictor is brazed in a predetermined position within a metallic tube connecting the condenser with the evaporator.

A sealed refrigeration system includes a compressor, a condenser, an expansion device and an evaporator connected in a circuit to provide refrigeration. Hot compressed refrigerant vapor from the compressor enters the condenser, where it transmits heat to an external heat exchange medium and condenses. Condensed refrigerant at a high pressure flows through the expansion device, where the refrigerant undergoes a pressure drop and at least partially flashes to a vapor. The liquid-vapor mixture flows through the evaporator and absorbs heat from the warm external surroundings to evaporate and usually superheat the refrigerant. The low pressure refrigerant vapor then returns to the compressor to complete the circuit.

Although the expansion device or flow restrictor is often of simple construction, its role in the refrigeration system is such that refrigerant leaving the evaporator is super heated in a controlled manner. The performance of the expansion device also plays a crucial role in the capacity of the system.

The simplest and most commonly used flow restrictor or expansion device is the capillary tube. In operation, refrigerant from the condenser enters the capillary and undergoes a frictional pressure drop along the length of the tube. The capillary tube is relatively inexpensive to manufacture and install but has several shortcomings.

The capillary tube is typically a thin-walled copper tube of small diameter wound in a loop-like form for an easier mounting in the refrigerator or like apparatus. In producing this conventional flow restrictor device, it is necessary to loop the tube at a large radius of curvature such that the cross-section of the tube is not distorted which would adversely affect the pressure reducing performance. Consequently, the capillary tube occupies a large space and is relatively fragile and must be handled with care to avoid distortion.

The capillary tube must be connected to the refrigerant line between the condenser and the evaporator. Typically, this requires braze joints at the inlet and outlet of the capillary tube. These joints are potential points of refrigerant leakage and add to the cost of installing the capillary tube into the refrigeration system.

It would be an improvement in the art, therefore, to provide a restriction device which overcame the problems of the capillary tube while maintaining the capillary tube benefits, namely low cost and ease in manufacturing.

SUMMARY OF THE INVENTION

An object of the present invention is to produce a flow restrictor for a refrigeration system which is relatively inexpensive and economical to manufacture.

A further object is to produce a flow restrictor which is easily handled in a manufacturing environment and not readily damaged.

Still another object of the present invention is to produce a flow restrictor for a refrigeration system which does not require brazed joints for connection with the refrigerant line connecting the condenser with the evaporator.

According to the present invention, the foregoing and other objects are attained by a refrigerant expansion device for expanding refrigerant flowing within a refrigerant line from a condenser to an evaporator in a refrigeration system. The refrigerant expansion device includes a tubular restrictor having a cylindrical main portion and a tapered nozzle portion wherein the nozzle portion includes an outlet end having an orifice. A solder ring is disposed about the tapered nozzle portion and may be press fit onto the restrictor for secure engagement therewith. During the expansion device fabrication, the tubular restrictor is inserted into the refrigerant line to a predetermined position. The exterior of the refrigerant line is then heated at the predetermined position such that heat is transferred through the refrigerant line and melts the solder ring thereby brazing the restrictor to the refrigerant line at the predetermined position. During the heating operation, the refrigerant line is oriented such that the solder ring is disposed above the cylindrical main portion such that the solder flows into the annular joint between the outer diameter of the restrictor and the inner diameter of the refrigerant line.

DESCRIPTION OF THE PREFERRED EMBODIMENT

Figure 1:
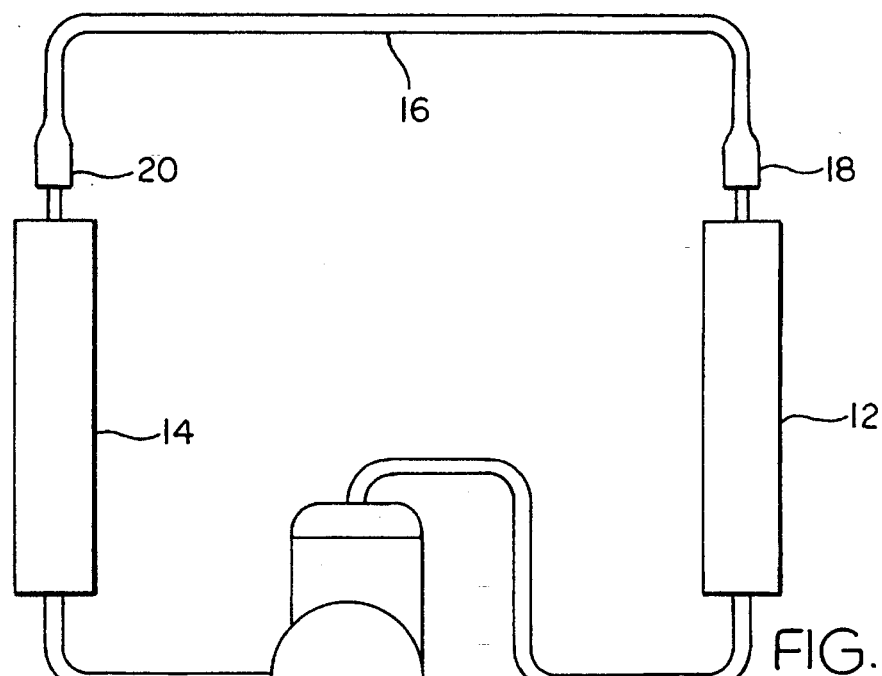
FIG. 1 is a schematic representation of a refrigeration system incorporating an expansion or flow restrictor device according to the present invention.

In FIG. 1, a refrigeration system is shown which includes a compressor 10, a condenser 12, an evaporator 14 and a refrigerant line 16 connecting the condenser 12 to the evaporator. The refrigerant line 16 is an integral metallic tube or conduit, preferably copper, having a first end 18 joined to the outlet of the condenser 12 and a second end 20 joined to the inlet of the evaporator 14. Preferably, the refrigerant line 16 is joined to the condenser 12 and the evaporator 14 by way of brazed joints.

Figure 2:
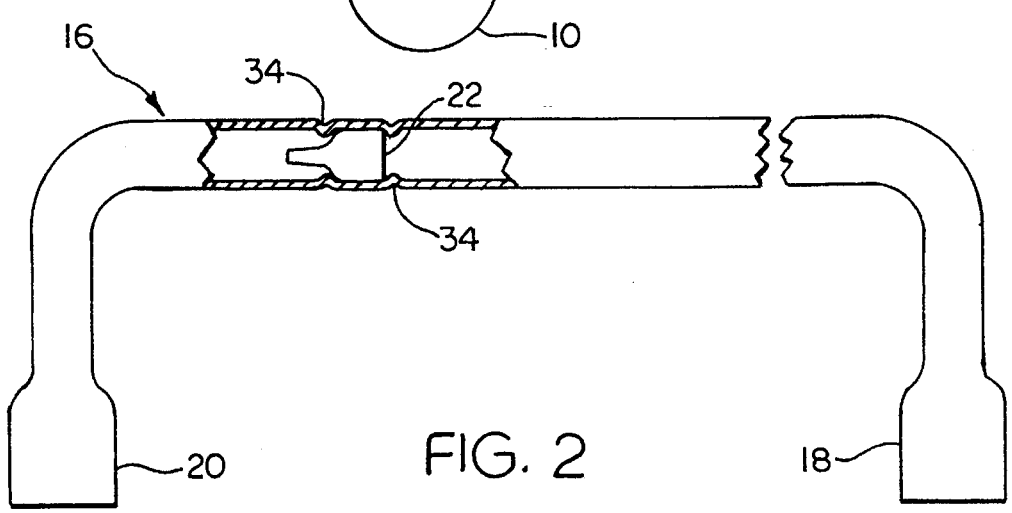
FIG. 2 is an enlarged view of the refrigerant line containing the expansion device of the present invention.

As shown in FIG. 2, an expansion device 22 is positioned within the refrigerant line 16. As described above, hot compressed refrigerant vapor from the compressor enters the condenser, where it transmits heat to an external heat exchange medium and condenses. Condensed refrigerant at a high pressure flows through the expansion device 22, where the refrigerant undergoes a pressure drop and at least partially flashes to a vapor. The liquid-vapor mixture flows through the evaporator and absorbs heat from the warm external surroundings to evaporate and usually superheat the refrigerant. The low pressure refrigerant vapor then returns to the compressor to complete the circuit.

Figure 3:
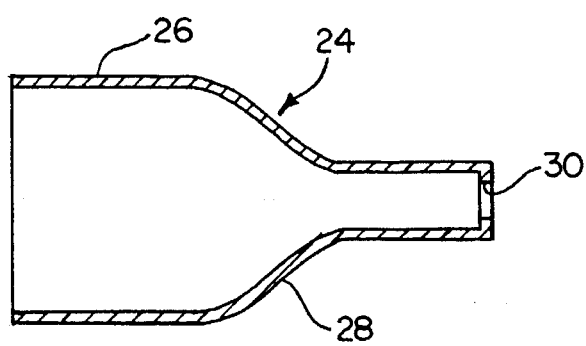
FIG. 3 is a cross-sectional view of the tubular restrictor of the present invention.
Figure 4:
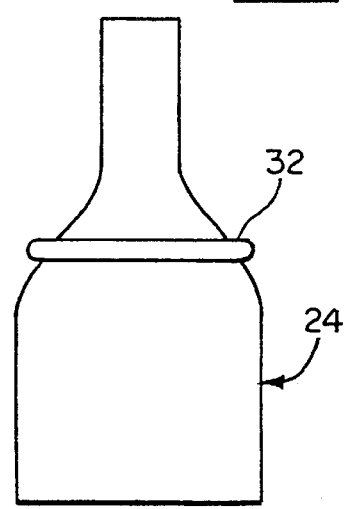
FIG. 4 is an elevational view of the assembled tubular restrictor and solder ring.

In FIGS. 3–4, the expansion device is shown in greater detail. The expansion device includes a tubular restrictor 24 having a cylindrical main portion 26 and a nozzle portion 28. An orifice 30 is formed at the outlet end of the nozzle portion 28. The nozzle portion 28 provides a gently converging section to gradually restrict the refrigerant flow toward the orifice 30. In this fashion, the refrigerant pressure is gradually reduced over the length of the nozzle portion 28. Refrigerant exiting from the orifice 30 undergoes a substantial pressure drop wherein the refrigerant expands to the mount required at this stage in the refrigeration cycle. As can be understood by one skilled in the art, the diameter of the orifice 30 is sized to provide the optimal orifice size for the specific refrigeration system employed.

As contemplated by the inventors of the present invention, the tubular restrictor 24 is a deep drawn copper member fabricated though the operation of multiple stampings on a progressive die apparatus. Subsequent to the fabrication of the tubular restrictor 24, a solder ring 32 is positioned about the nozzle portion 28 of the restrictor 24. The solder ring is preferably press fit onto the nozzle portion 28 for secure engagement with the restrictor 24. The solder ring 32 is an annular member having a generally circular cross section.

The assembled tubular restrictor 24 and solder ring 32 are inserted into the refrigerant line 16 to a predetermined position. Once disposed in the predetermined position, indentations 34 may be formed into the refrigerant line 16 for locating the tubular restrictor 24 within the refrigerant line 16. Thereafter, heat is applied to the exterior of the refrigerant line 16 at the predetermined position. Heat is transferred through the refrigerant line 16 and the solder ring 32 is melted. During the heating of the exterior of the refrigerant line 16, the refrigerant line is oriented such that the axis of the restrictor 24 is substantially vertically aligned and the nozzle portion 28 is disposed above the main body portion 26. In this fashion, the solder flows into the annular joint between the inner diameter of the refrigerant line 16 and the outer diameter of the main body portion 26 such that the restrictor 24 is brazed in the predetermined position with the refrigerant line. The heating of the exterior of the line 16 may be accomplished by flame or induction heating.

Although the present invention has been described with reference to a specific embodiment, those of skill in the art will recognize that changes may be made thereto without departing from the scope and spirit of the invention as set forth in the appended claims.

We claim:

1. A method of producing a flow restrictor device, the method comprising the steps of:

inserting to a predetermined position a tubular restrictor into a metallic tube, said tubular restrictor having an orifice and further having a solder ring disposed about the tubular restrictor; and heating the exterior of said metallic tube at said predetermined position such that heat is conducted through said metallic tube and melts said solder ring such that said tubular restrictor is brazed to said metallic tube at said predetermined position.

2. The method of producing a flow restrictor device according to claim 1 further comprising the steps of:

positioning said tubular restrictor within said metallic tube;

forming an indentation into said metallic tube adjacent said tubular restrictor; and applying heat to the exterior of said metallic tube adjacent said indentation such that said tubular restrictor is brazed to said metallic tube.

3. The method of producing a flow restrictor device according to claim 1 further comprising the steps of:

fabricating said tubular restrictor by utilizing multiple stampings on a progressive die apparatus.

4. The method of producing a flow restrictor device according to claim 1 further comprising the steps of:

forming said tubular restrictor having a main body portion and a nozzle portion having an outlet end, said orifice being located at said outlet end of said nozzle portion; and positioning said solder ring about said nozzle portion of said tubular restrictor.

5. The method of producing a flow restrictor device according to claim 4 further comprising the steps of:

orienting said metallic tube during heating such that the axis of said tubular restrictor is vertically aligned such that when said solder ring melts the solder flows between the annular joint between the inner diameter of said metallic tube and the outer diameter of said tubular restrictor.

6. A method of producing a refrigerant expansion device in a refrigerant line connecting a condenser with an evaporator in a refrigeration system, the method comprising the steps of:

forming a tubular restrictor;

positioning a solder ring about said tubular restrictor;

inserting to a predetermined position said tubular restrictor into said refrigerant line; and heating the exterior of said refrigerant line at said predetermined position to braze said tubular restrictor to said refrigerant line.

7. The method of producing a refrigerant expansion device in a refrigerant line according to claim 6 further comprising the steps of:

fabricating said tubular restrictor by utilizing multiple stampings on a progressive die apparatus.

8. The method of producing a refrigerant expansion device in a refrigerant line according to claim 6 further comprising the steps of:

forming said tubular restrictor having a main body portion and a nozzle portion, said nozzle portion having an outlet end having an orifice; and positioning said solder ring about said nozzle portion of said tubular restrictor.

9. The method of producing a refrigerant expansion device in a refrigerant line according to claim 8 further comprising the steps of:

orienting said refrigerant line during heating such that the axis of said tubular restrictor is vertically aligned such that when said solder ring melts the solder flows between the annular joint between the inner diameter of said refrigerant line and said outer diameter of said tubular restrictor.

* * * * *